United States Patent
Matsuoka

[19]

[11] Patent Number: 6,141,179
[45] Date of Patent: *Oct. 31, 2000

[54] RECORDING AND/OR REPRODUCING APPARATUS CAPABLE OF USING CASSETTES HAVING DIFFERENT SIZES INCLUDING A DEVICE FOR ADJUSTING TENSION ON A SUPPLY REEL BASE BASED ON THE CASSETTE SIZE

[75] Inventor: Hidetoshi Matsuoka, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,730

[22] Filed: Mar. 31, 1997

Related U.S. Application Data

[62] Division of application No. 08/280,505, Jul. 22, 1994, Pat. No. 5,625,509.

[30] Foreign Application Priority Data

Jul. 30, 1993 [JP] Japan .................................. 5-190234

[51] Int. Cl.[7] .......................... G11B 15/32; G11B 15/43
[52] U.S. Cl. ............................ 360/94; 360/74.3; 360/85; 242/336; 242/334
[58] Field of Search ............................ 360/94, 85, 74.3, 360/96.3; 242/336, 334.6, 334, 343.1, 343.2

[56] References Cited

U.S. PATENT DOCUMENTS

| | | | |
|---|---|---|---|
| 4,661,864 | 4/1987 | Kuwajima | 360/85 |
| 4,664,337 | 5/1987 | Shiratori | 360/94 |
| 4,814,912 | 3/1989 | Kleinlein et al. | 360/96.3 |
| 5,305,162 | 4/1994 | Kushiro et al. | 360/85 |
| 5,445,337 | 8/1995 | Kwon | 242/334.6 |
| 5,605,300 | 2/1997 | Uetake et al. | 360/94 |
| 5,636,805 | 6/1997 | Fukuzawa | 360/94 |

FOREIGN PATENT DOCUMENTS

| | | | |
|---|---|---|---|
| 60-106052 | 6/1985 | Japan | 360/74.3 |
| 62-047853 | 3/1987 | Japan | 360/74.3 |
| 63-179446 | 7/1988 | Japan | 360/74.3 |
| 63-179447 | 7/1988 | Japan | 360/74.3 |
| 2-12641 | 1/1990 | Japan | 360/74.3 |
| 2-220251 | 9/1990 | Japan | 360/74.3 |
| 3-354459 | 2/1991 | Japan | 360/74.3 |
| 5-006600 | 1/1993 | Japan | 360/74.3 |
| 6-111428 | 4/1994 | Japan | 360/74.3 |

*Primary Examiner*—Craig A. Renner
*Attorney, Agent, or Firm*—Fitzpatrick, Cella, Harper & Scinto

[57] ABSTRACT

An apparatus performs recording and/or reproduction of signals by a head of a drum with which a tape-like recording medium is brought into contact while being moved under a fixed tension from a reel engaging a supply reel base to a reel engaging a take-up reel base. An arm retains a tension post which presses against the recording medium, forming a predetermined path to detect a tension thereof. One end of the arm is pivotally supported, and the arm is urged by a spring so as to allow the tension post to elastically press against the recording medium. At least one end of a band brake for loading a braking torque on the supply reel base is locked to the arm. The locking points of both two ends of the band brake are at positions which are substantially symmetrical with respect to a perpendicular bisector of a line connecting a center of the supply reel base when a first recording tape cassette is used to a center of the supply reel base when a second recording tape cassette having a size different from that of the first cassette is used.

5 Claims, 5 Drawing Sheets

RECORDING AND/OR REPRODUCING APPARATUS CAPABLE OF USING CASSETTES HAVING DIFFERENT SIZES INCLUDING A DEVICE FOR ADJUSTING TENSION ON A SUPPLY REEL BASE BASED ON THE CASSETTE SIZE

This application is a divisional of application Ser. No. 08/280,505, filed Jul. 22, 1994 now U.S. Pat. No. 5,625,509.

BACKGROUND OF THE INVENTION

1. Field of the Invention

The present invention relates to a video cassette recorder (hereinafter referred to as a VCR) designed to perform recording and reproduction of signals on tapes accommodated in two types of tape cassettes (hereinafter referred to as cassettes), having different sizes, by a head of a drum disposed midway in a tape path starting with a reel engaging a supply reel base and ending with a reel engaging a take-up reel base so that the tape can be wound therearound at a predetermined angle while it is moving from the supply reel to the take-up reel under a fixed tension.

2. Description of the Related Art

In a conventional VCR, recording or reproduction of signals is performed by a head of a drum disposed midway in a tape path starting with a reel engaging a supply reel base and ending with a reel engaging a take-up reel base so that the tape can be wound therearound at a predetermined angle while it is moving from the supply reel to the take-up reel under a fixed tension.

FIG. 1 is a perspective view of components of a structure for winding the tape under a fixed tension.

Reference numeral 106 denotes a tension post which is elastically brought into contact with a recording tape 30 forming a predetermined path for detecting the tension of the tape. A tension arm 114 for retaining the tension post 106 is supported in such a manner as to be pivotal about a shaft 114b at one end 114a thereof. The tension arm 114 is urged by a spring 115 counterclockwise so that it can elastically press against the tape 30. The tension of the recording tape 30 acts on the tension post in the form of a moment of force which rotates the tension arm 114 clockwise. After the tension arm 114 has shifted clockwise and the tape 30 thereby extends along a straight line, the moment of force applied to the tension arm 114 reduces even when the same amount of tension is applied to the tension arm 114. One end 116a of a band brake 116 is coupled to the tension arm 114. The other end 116b of the band brake 116 is fixed to a substrate of a device.

In the above-described structure, the band brake 116 can load an adequate braking torque on the rotation of a supply reel base 117.

More specifically, when the tension of the tape 30 is increased, the tension arm 114 shifts to the right, reducing the load on the band brake 116. Consequently, the resisting force of the supply reel base 117 to the tape 30 is reduced, reducing the tension of the tape 30. When the tension of the tape 30 is reduced, the tension arm shifts counterclockwise, increasing the load on the band brake 116. Consequently, the braking force of the supply reel base 117 which acts on the tape 30 increases, thus increasing the tension of the tape 30.

Tension control means arranged in the manner described above maintains the tension of the tape 30 to a fixed value by controlling the braking force applied to the tape 30 supplied from the supply reel base 117.

In recent years, there have been demands for reduction in the size of the apparatus and for increase in the recording time, and tapes employing cassettes having different sizes are available on the market.

Conventional VCRs employing cassettes having different sizes are mainly for business use. In order to apply a predetermined stable tension to the tape, such a VCR adopts an electric tension control means in place of a conventional mechanical tension control means.

However, in the electric tension control means, the reel must be driven by a direct motor dedicated to the use of the reel, thus increasing production cost.

In the mechanical tension control means, since the position of the reel is limited by the band brake serving as the control means, the reel and the tension control means must be moved together, making the device complicated.

SUMMARY OF THE INVENTION

In view of the aforementioned problems, an object of the present invention is to provide an apparatus capable of recording and/or reproducing signals while mechanically applying a predetermined tension to the tape, even when cassettes having different sizes are used.

In order to achieve the above object, the present invention in one aspect provides a recording and/or reproducing apparatus usable with cassettes having different sizes that have a tape-like recording medium affixed to a pair of reels. The apparatus includes a head for recording information on the recording medium and/or reproducing information from the recording medium; a pair of reel bases to which the pair of reels can be brought into engagement; and a moving mechanism for moving the pair of reel bases between a first position and a second position corresponding to different-sized cassettes. The apparatus also includes a detecting member, which makes contact with the recording medium thereby forming a predetermined path between one reel base of the pair of reel bases and the head, for detecting a state of the recording medium. A pivot member having a pivotally supported end and an end opposite the pivotally supported end is also included, wherein the detecting member is provided on the opposite end. Also provided is a belt-like member that has two end portions and which is wound around one reel base. At least one end portion of the belt-like member is mounted on the pivot means and the two end portions of the belt-like member are positioned a substantially equal distance from a perpendicular bisector of a line connecting a center point of the one reel base at the first position to a center point of the same reel base at the second position. The apparatus also includes urging means for urging the pivot means in a direction that tends to cause the belt-like member to exert a braking force on the one reel base.

According to another aspect of the present invention, a braking mechanism for a reel base is provided. The braking mechanism includes pivotally supported pivot means; a belt-like member wound around the reel base, the two end portions of the belt-like member being mounted on the pivot member; and urging means for urging the pivot means in a direction that tends to increase a pressing force with which the belt-like member winds around the reel base.

Other objects and advantages of the present invention will become apparent from the following description taken in connection with the accompanying drawings.

DETAILED DESCRIPTION OF THE PREFERRED EMBODIMENTS

Embodiments of the VCR according to the present invention will be described with reference to the accompanying drawings. A signal processing circuit for recording/reproduction is well-known in the VCR arts and its specific description is omitted. Thus, a structure for applying a fixed tension to the tape by controlling the braking torque applied to the supply reel base will be described below.

(First Embodiment)

Figure 1:
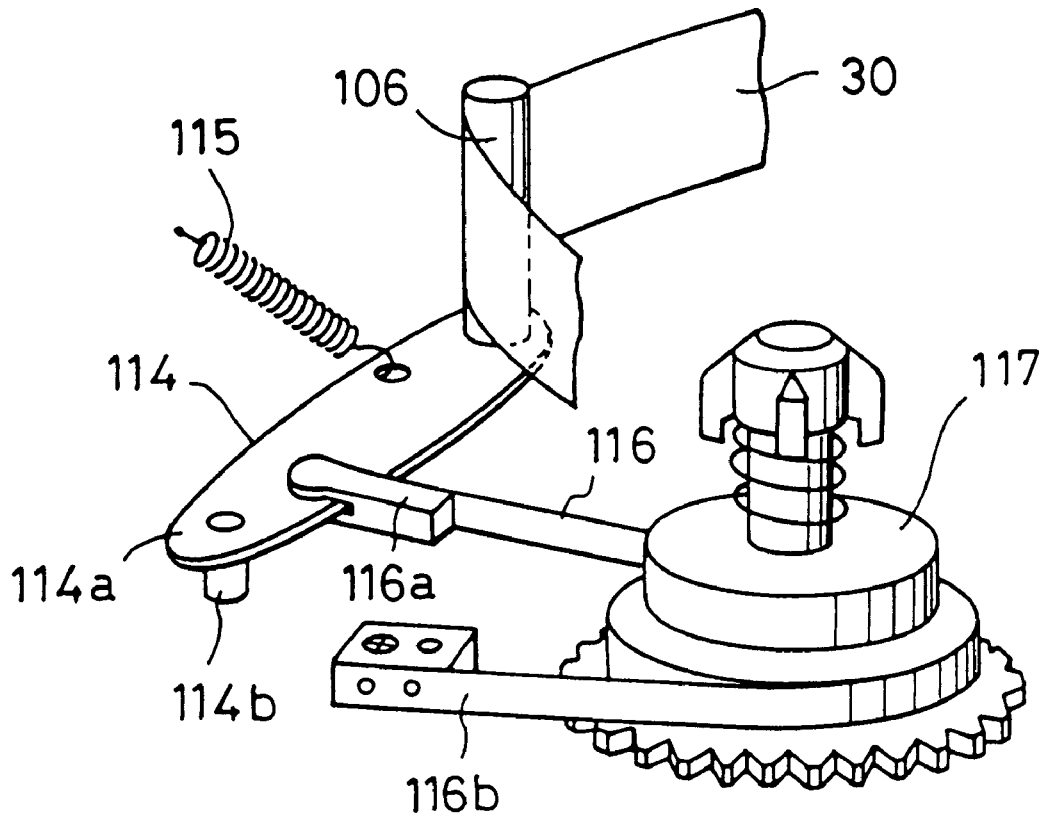
FIG. 1 is a perspective view of the features of a conventional VCR.
Figure 2:
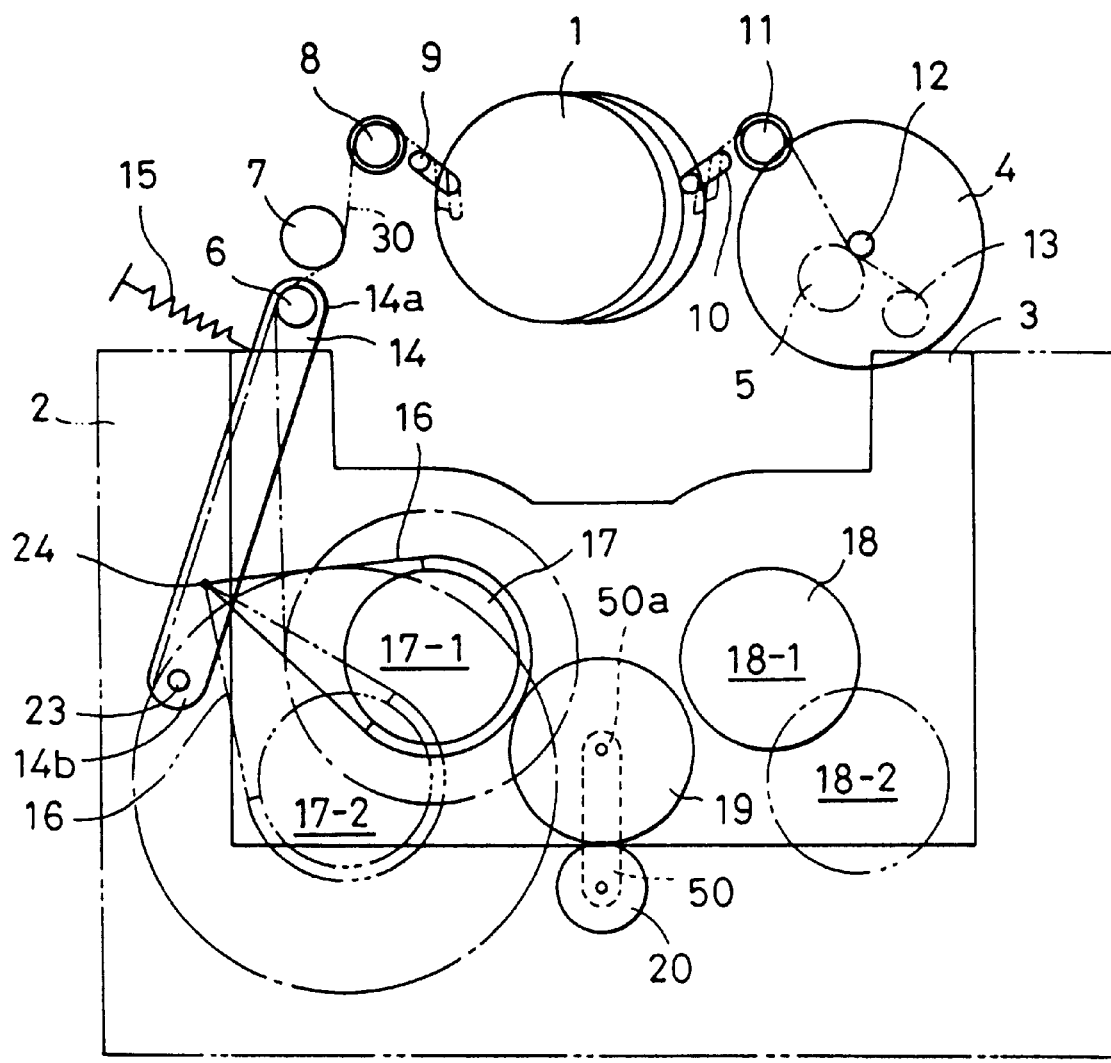
FIG. 2 illustrates how cassettes having different sizes are used in a first embodiment of the present invention.
Figure 3:
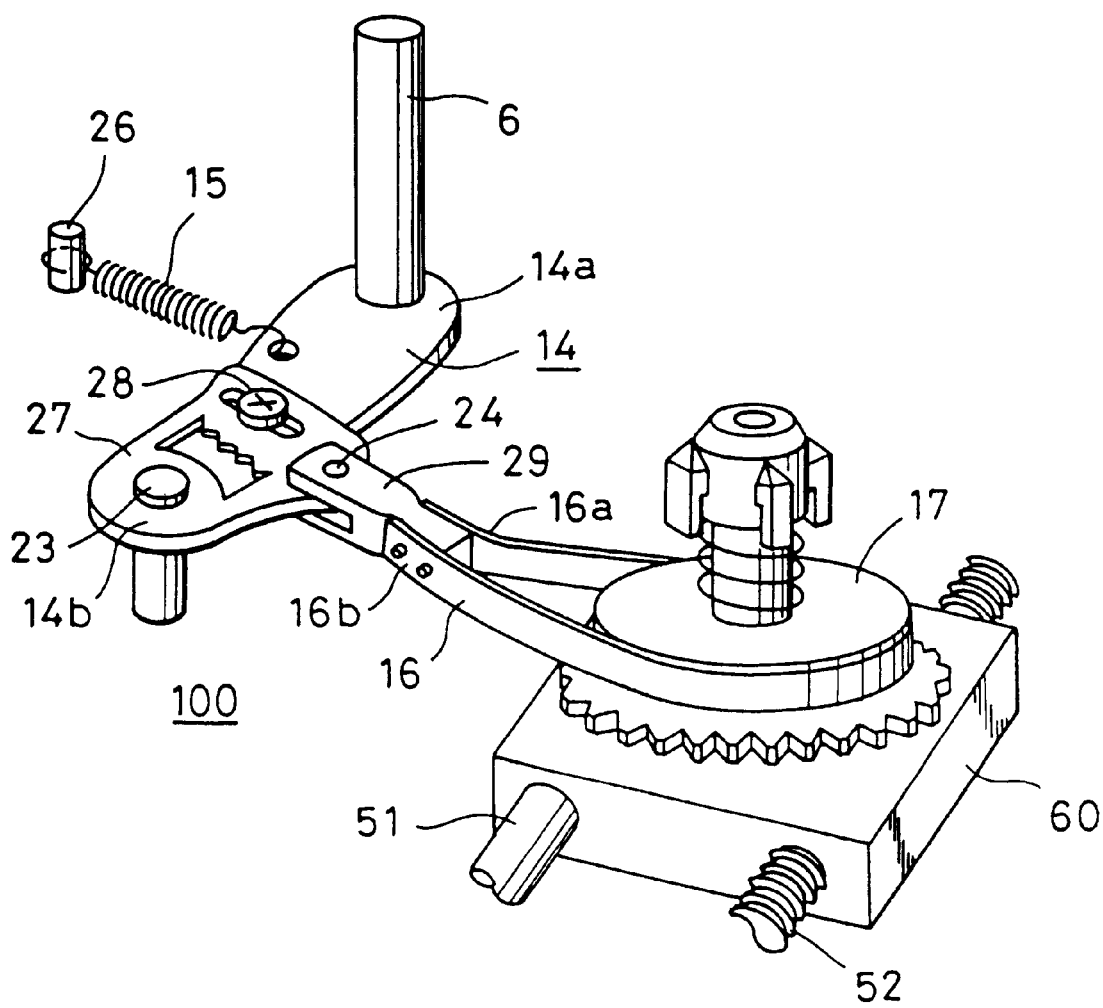
FIG. 3 is a perspective view of the features of the first embodiment.
Figure 4:
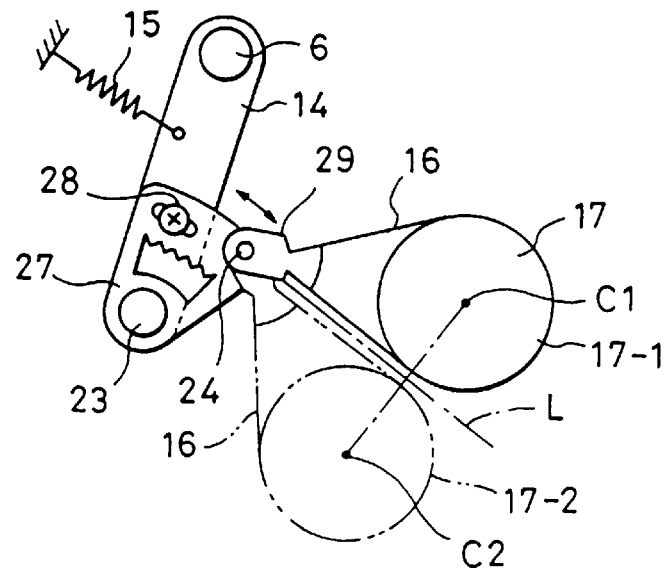
FIG. 4 illustrates the layout of a band brake in the first embodiment.

FIG. 2 illustrates how a band brake acts when cassettes having different sizes are used in a first embodiment of the present invention. FIG. 3 is a perspective view of the features of the first embodiment. FIG. 4 illustrates the layout of the band brake of the first embodiment.

In FIGS. 2, 3 and 4, reference numeral 1 denotes a rotary drum having a head for performing recording and/or reproduction with a tape 30. Reference numeral 2 denotes a first cassette having a large size. Reference numeral 3 denotes a second cassette having a small size. Reference numeral 4 denotes a capstan motor. Reference numeral 5 denotes a pinch roller. Reference numerals 7, 8, 9, 10, 11 and 13 respectively denote tape guides. Reference numeral 12 denotes a capstan.

A tension arm 14 has a tension post 6 at one end 14a thereof. The other end 14b of the tension arm 14 is pivotally supported by a shaft 23. The tension arm 14 transmits, to a band brake 16, a difference between the moment of force generated by the tension of the tape 30 and the moment of force generated by a spring 15. The shaft 23 is provided upright in a chassis 100.

A band brake 16 is brought into contact with the outer periphery of a supply reel base 17. Two ends 16a and 16b of the band brake 16 are pivotally locked to the same site of the tension arm 14 via a member 29. The band brake 16 adjusts the braking force to the supply reel base 17 in accordance with the tension which the band brake 16 receives from the tension arm 14.

A supply reel base 17 is placed on a movable base 60, which engages a guide shaft 51. The movable base 60 moves between positions 17-1 and 17-2 as a consequence of rotation of a driving shaft 52 in order to cope with the sizes of both the first cassette 2 and the second cassette 3. The same mechanism as the above-described mechanism is provided on the side of a take-up reel base 18. The movement of the reel bases 17 and 18 is synchronous. This synchronous movement is made possible by synchronously driving a motor (not shown) for rotating the driving shaft 52 and a motor (not shown) for rotating a driving shaft (not shown) on the side of the take-up reel base 18 by means of a controller (not shown). Alternatively, the synchronous movement is made possible by transmitting the driving force of the driving shaft 52 to the other driving shaft via a gear (not shown).

17-1 indicates the position of the supply reel base 17 when the small-sized cassette 3 is used, and 17-2 indicates the position of the supply reel base 17 when the large-sized cassette 2 is used. The state of the band brake 16 in each case is also illustrated. The respective components located at position 17-2 are indicated by a dot-dot-dashed line.

Reference numeral 19 denotes an oscillating gear which is meshed with a drive gear 20 for driving the supply reel base 17 or the take-up reel base 18. 18-1 indicates the position of the winding reel base 18 when the small-sized cassette 3 is used, and 18-2 indicates the position of the take-up reel base 18 when the large-sized cassette 2 is used. The oscillating gear 19 is rotatably supported on an end 50a of an arm 50 pivotally supported by a shaft of the drive gear 20. In this way, the oscillating gear 19 can be brought into engagement with the reel bases 17 and 18 at positions 17-1, 17-2, 18-1 and 18-2, respectively.

A spring lock 26 shown in FIG. 3 is provided on the chassis to lock one end of the spring 15. A brake tension adjusting member 27, which is pivotally supported by the shaft 23, is fixed to the tension arm 14 by means of a screw 28 in such a manner that the angle at which it is fixed to the arm is adjustable. The brake tension adjusting member 27 pivotally supports the member 29 for locking the two ends 16a and 16b of the band brake 16 via the shaft 24.

As shown in FIG. 4, the shaft 24 for rotatably supporting the member 29 for locking the two ends 16a and 16b of the band brake 16 is located substantially on a perpendicular bisector L of a line connecting a center C1 of the supply reel base 17 located at position 17-1, which corresponds to the small-sized cassette 3 being used, to a center C2 of the supply reel base 17 located at position 17-2, which corresponds to the large-sized cassette 2 being used.

In the above-described structure, since the member 29 is pivotally supported by the shaft 24, no matter where the supply reel base 17 is located, at position 17-1 or 17-2, a distance between the locking point of the band brake 16, for loading a braking torque on the supply reel base 17, and the supply reel base 17 and the length in which the band brake 16 makes contact with the supply reel base 17, are the same. The same braking force can thus be loaded on the supply reel base 17. In order to adjust the braking tension, the screw 28 is loosened, the angle of the brake tension adjusting member 27 relative to the tension arm 14 is adjusted, and then the screw is tightened.

Thus, an adequate braking torque can be loaded on the supply reel base 17 according to the tension of the tape wound around the tension post 6 similarly in both cases when the first and second cassettes 2 and 3 having different sizes are used. Consequently, even when cassettes having different sizes are used, the tape-like recording medium 30 can be moved under a fixed tension from the reel engaging the supply reel base 17 to the reel engaging the take-up reel base 18 so as to allow signals to be recorded or reproduced by a head of the drum 1 around which the recording medium 30 is wound.

(Second Embodiment)

In a second embodiment, the recording/reproducing signal processing circuit and other structures are the same as those of a conventional VCR, and description thereof is omitted. The structure for applying a fixed tension to the tape by controlling a braking torque on the supply reel base will be described below.

Figure 5:
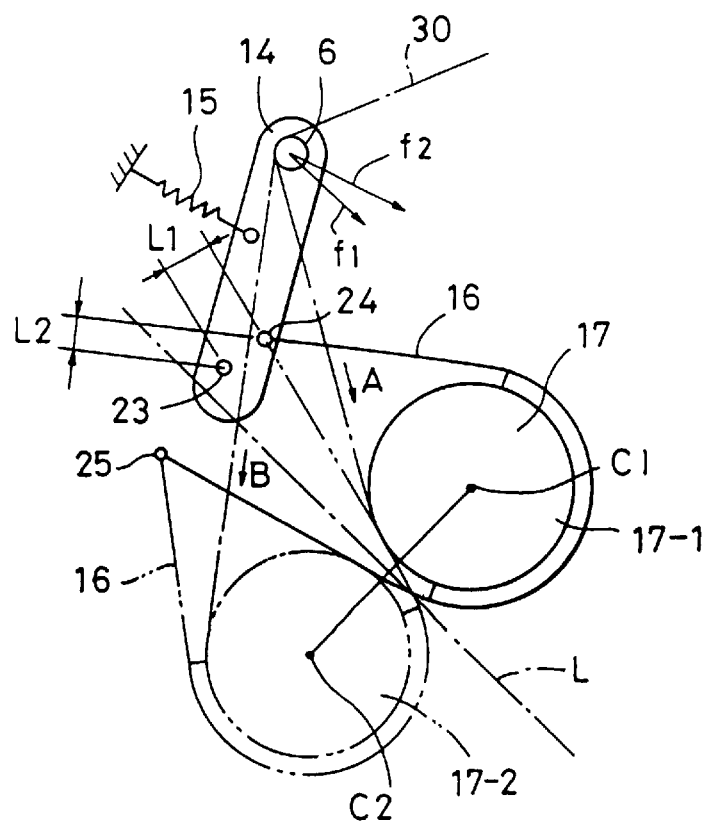
FIG. 5 illustrates how cassettes having different sizes are used in a second embodiment of the present invention.
Figure 6:
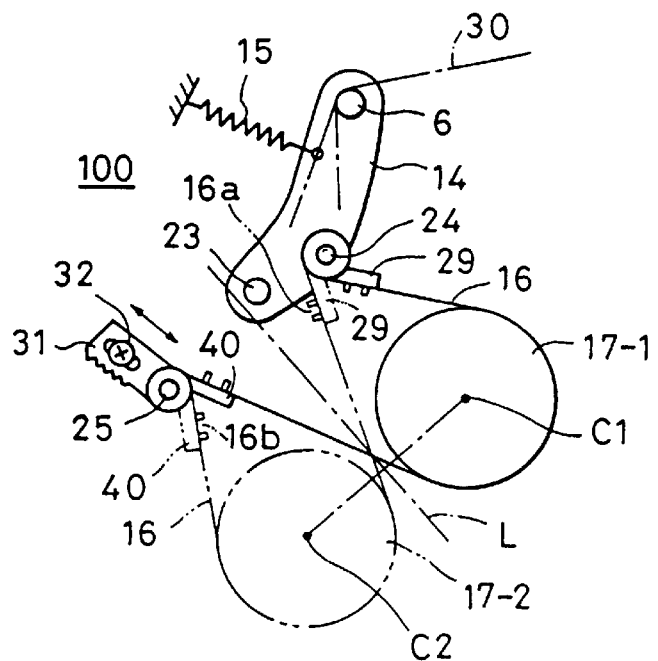
FIG. 6 illustrates the layout of a band brake in the second embodiment.

FIG. 5 illustrates how the band brake acts when cassettes having different sizes are used in the second embodiment. FIG. 6 illustrates the layout of the band brake in the second embodiment. Reference numerals in these figures identical to those in FIGS. 2 through 4 represent similar or identical elements.

In the second embodiment, one end 16a of the band brake 16 is pivotally locked to the shaft 24 of the tension arm 14 by means of the member 29, while the other end 16b of the band brake 16 is pivotally locked to a shaft 25 provided on an adjusting member 31 on which a member 40 is mounted. The adjusting member 31 is fixed to the chassis 100 by means of a screw 32 in such a manner that the position thereof can be adjusted in directions indicated by a bidirectional arrow so as to allow the position of the tension post 6 to be adjusted.

The shafts 24 and 25 are located at positions which are substantially symmetrical with respect to the perpendicular bisector L of the line connecting the center C1 of the supply reel base 17 when the small-sized cassette 3 is used to the center C2 of the supply reel base 17 when the large-sized cassette 2 is used. Consequently, whether the supply reel base 17 is located at position 17-1 or 17-2, a distance between the locking point of the band brake 16, for loading a braking torque on the supply reel base 17, and the supply reel base 17, as well as the shape which which the band brake 16 makes contact with the reel base 17, are the same.

As a result, the same effect as that of the first embodiment can be obtained.

As shown in FIG. 5, even if the tension of the tape is the same, since a direction A in which the tape 30 extends from the tension post 6 to the small-sized cassette 3 and a direction B in which the tape 30 extends to the large-sized cassette 2 differ from each other, a force f2 applied to the tension post 6 from the recording tape when the small-sized cassette 3 is used is larger than a force f1 when the large-sized cassette 2 is used. However, by making perpendicular distances L2 and L1 from the center of pivot 23 of the tension arm 14 to the extensions of the band brake 16 coupled to the tension arm 14, corresponding to positions 17-1 and 17-2, respectively, satisfy L2<L1, as shown in FIG. 5, tension control characteristics can be made the same in both cases in which large-sized and small-sized cassettes are used.

(Third embodiment)

Figure 7:
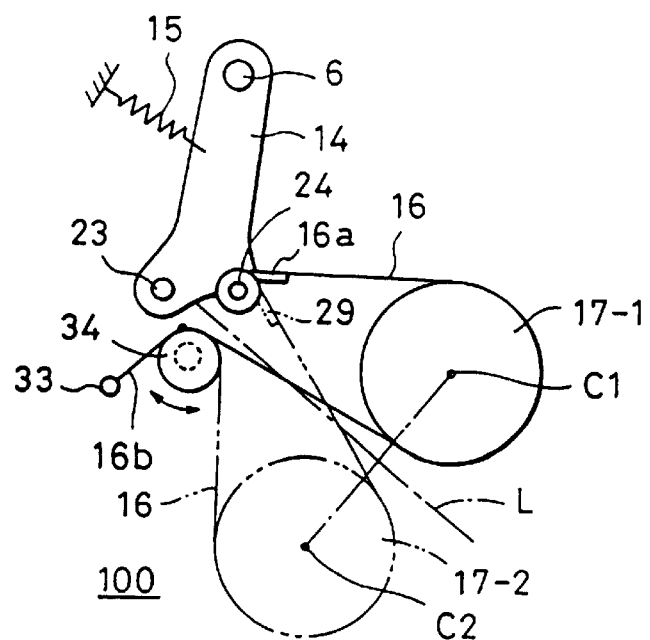
FIG. 7 illustrates the layout of a band brake in a third embodiment of the present invention.

FIG. 7 illustrates the layout of the band brake in a third embodiment of the present invention. Identical reference numerals are used to denote elements identical or similar to those of the first and second embodiments.

In the third embodiment, one end 16a of the band brake 16 is pivotally locked to the shaft 24 of the tension arm 14 via the member 29, and the other end 16b of the band brake 16 is fixed to the chassis 100 by means of a fastener 33. The band brake 16 is bent by an eccentric pin 34 near the other end 16b thereof.

That is, the eccentric pin 34 corresponds to one of the locking points of the band brake 16, and the shaft 24 and the eccentric pin 34 are located at positions which are substantially symmetrical with respect to the perpendicular bisector L of the line connecting the center C1 of the supply reel base 17, when the small-sized cassette 3 is used, to the center C2 of the supply reel base 17, when the large-sized cassette 2 is used. Consequently, the same effect as that of the second embodiment can be obtained. The position of the tension pin 6 can be adjusted by rotating the eccentric pin 34.

As will be understood from the foregoing description, in the above-described embodiments, regardless of what size of cassette is used, the distance between the locking point of the band brake, for loading a brake torque on the supply reel base, and the supply reel base, as well as the length in which the band brake is brought into contact with the reel base, are the same. An adequate brake torque can thus be loaded on the supply reel base by the arm for retaining the tension post, which is pressed against the tape for detecting the tension of the tape in both cases where first and second tapes having different sizes are used. Consequently, when cassettes having different sizes are used, the tape-like recording medium can be moved under a fixed tension from the reel engaging the supply reel base to the reel engaging the take-up reel base so as to allow signals to be recorded or reproduced by the head of the drum around which the recording medium is wound, and high-definition recording/reproduction functions can thus be achieved when recording tape cassettes having different sizes are used.

What is claimed is:

1. A recording and/or reproducing apparatus accommodating different-sized cassettes, each cassette having a tape-like recording medium affixed to a pair of reels receivable on a chassis of the recording and/or reproducing apparatus, said recording and/or reproducing apparatus comprising:

a head for recording information on the recording medium and/or reproducing information from the recording medium;

a pair of reel bases to which the pair of reels are engageable;

a reel base moving mechanism for moving each of said pair of reel bases between a first operating position of one of the different-sized cassettes and a second operating position of an other one of the different-sized cassettes;

a tension detecting member, which makes contact with the recording medium so as to form a predetermined path between one reel base of said pair of reel bases and said head, and detects a tension of the recording medium;

a pivot member having a pivotally supported end and an opposite end that is opposite said pivotally supported end, wherein said detecting member is provided on said opposite end;

a belt-like member, having two end portions, which is wound around said one reel base, wherein one of the two end portions of said belt-like member is mounted on said pivot member and the other of the two end portions is mounted on the chassis, and wherein said two end portions of said belt-like member are positioned a substantially equal distance from a perpendicular bisector of a line connecting a center point of said one reel base at the first operating position of the one sized cassette to the center point of said one reel base at the second operating position of the other one of the different-sized cassettes; and urging means for urging said pivot member in a direction that causes said belt-like member to exert a braking force to said one reel base, the force being substantially the same for each of the different-sized cassettes.

2. A recording and/or reproducing apparatus according to claim 1, wherein said one of the two end portions of said belt-like member is fixed to a first member pivotally mounted on said pivot member, while the other of the two end portions is fixed to a second member pivotally mounted on said chassis.

3. A recording and/or reproducing apparatus according to claim 2, wherein said second member is mounted on said chassis via a third member whose fixed position to said chassis is adjustable.

4. A recording and/or reproducing apparatus according to claim 1, wherein said belt-like member makes contact with an eccentrically shaped pin between the other of the two end portions of said belt-like member mounted on the chassis and said one reel base.

5. A braking mechanism for a reel base on a chassis, said braking mechanism comprising:

a pivot member that is pivotally supported on the chassis;

a belt-like member, having two end portions, which is wound around the reel base, wherein one of the two end portions of said belt-like member is mounted on said pivot member and the other of the two end portions is mounted on the chassis, and wherein said belt-like member makes contact with an eccentrically shaped pin between the other of the two end portions of said belt-like member mounted on the chassis and the reel base; and an urging member for urging said pivot member in a direction that tends to increase a pressing force which said belt-like member exerts on the reel base.

* * * * *